United States Patent [19]

Charbonnel

[11] Patent Number: 5,431,534
[45] Date of Patent: Jul. 11, 1995

[54] REMOVABLE INSPECTION HOLE PLUG

[75] Inventor: Jean-Louis Charbonnel, Boissise le Roi, France

[73] Assignee: (S.N.E.C.M.A.) Societe National d'Etude et de Construction de Moteurs d'Aviation, Paris, France

[21] Appl. No.: 276,885

[22] Filed: Jul. 18, 1994

[30] Foreign Application Priority Data

Jul. 21, 1993 [FR] France ................... 93 08939

[51] Int. Cl.⁶ ............................................. F01D 25/00
[52] U.S. Cl. ...................................... 415/118; 415/136; 415/138; 415/201; 60/39.33
[58] Field of Search ................ 415/118, 134, 136, 138, 415/201; 60/39.33

[56] References Cited

U.S. PATENT DOCUMENTS

| | | | |
|---|---|---|---|
| 3,362,160 | 1/1968 | Bourgeois | 415/118 |
| 4,406,580 | 9/1983 | Baran, Jr. | |
| 4,815,276 | 3/1989 | Hansel et al. | 415/118 |
| 5,115,636 | 5/1992 | Zeiser | |
| 5,185,996 | 2/1993 | Smith et al. | 415/118 |

FOREIGN PATENT DOCUMENTS 2510180 1/1983 France.

Primary Examiner—Edward K. Look
Assistant Examiner—James A. Larson
Attorney, Agent, or Firm—Bacon & Thomas

[57] ABSTRACT

A removable inspection hole plug for sealing a plurality of inspection holes formed in a double-walled enclosure is disclosed in which individual sealing units are disposed in each of the inspection holes, with the individual sealing units linked together by a link rod pivotally attached to each of the sealing units. A seal is provided on each of the sealing units which slideably engages a wall defining the inspection hole and the link rod may be attached to the sealing units by a ball and socket swivel joint. One of the sealing units is attached to a housing which is, in turn, removably attached to the enclosure such that the sealing unit may undergo limited axial movement relative to the housing. This accommodates differential thermal expansion between the walls of the enclosures and also facilitates removal of the inspection hole plug by merely unfastening the housing from the enclosure and removing the housing along with the sealing units.

9 Claims, 2 Drawing Sheets

5,431,534

REMOVABLE INSPECTION HOLE PLUG

BACKGROUND OF THE INVENTION

The present invention relates to a removable inspection hole plug for sealing inspection holes formed in a plurality of enclosures wherein the plug may accommodate differential expansion of the enclosure walls.

It is known in the art to provide enclosure housings which enclose various devices with inspection ports or holes to enable the insertion of instruments, such as a borescope, into the enclosure to inspect or monitor the condition of the enclosed mechanism. Such monitoring typically takes place during maintenance periods for the mechanism. At all other times, the inspection holes must be sealed.

In the case of gas turbine engines, the enclosures typically are double-walled enclosures having fluids on opposite sides of the enclosure walls at different temperatures. When such double-walled enclosures contain fluids at approximately the same temperature, the thermal expansions of the enclosures are very nearly equal and known sealing plugs may be utilized with great effect. However, in instances wherein the double-walled enclosures come into contact with fluids at different temperatures, the thermal expansions of the enclosure walls will be unequal to such an extent that a single plug no longer is adequate to simultaneously seal the two inspection ports in the double walls.

French Patent No. 2,510,180 discloses an inspection hole plug for a gas turbine engine wherein sealing elements are integrally joined together. Such integral construction of this plug restricts the applicability of this design in resolving the aforementioned problem of differential thermal expansion.

SUMMARY OF THE INVENTION

A removable inspection hole plug for sealing a plurality of inspection holes formed in a double-walled enclosure is disclosed in which individual sealing units are disposed in each of the inspection holes, with the individual sealing units linked together by a link rod pivotally attached to each of the sealing units. A seal is provided on each of the sealing units which slideably engages a wall defining the inspection hole and the link rod may be attached to the sealing units by a ball and socket swivel joint. One of the sealing units is attached to a housing which is, in turn, removably attached to the enclosure such that the sealing unit may undergo limited axial movement relative to the housing. This accommodates differential thermal expansion between the walls of the enclosures and also facilitates removal of the inspection hole plug by merely unfastening the housing from the enclosure and removing the housing along with the sealing units.

The invention relates to a sealing plug which can be removed from inspection holes defined by first and second walls of the enclosures in which the enclosures may contain fluids at different temperatures. The inspection holes may have generally cylindrical configurations and are sealingly engaged by seals attached to each of the sealing units.

The housing attached to the enclosure and connected to the sealing units defines a blind hole into which extends an end of a pull rod which is fixedly attached to one of the sealing units. The pull rod is affixed to the housing such that it may undergo limited axial movement with respect to the housing. The housing may be attached to the enclosure defining one of the inspection holes, or it may be attached to a wall of a separate enclosures distinct from the enclosure defining the aforementioned inspection holes.

The main advantage of the inspection plug according to the invention is its ability to properly seal the two inspection holes without in any way hindering the displacements of the enclosure walls caused by differential thermal expansion.

DETAILED DESCRIPTION OF THE PREFERRED EMBODIMENTS

Figure 1:
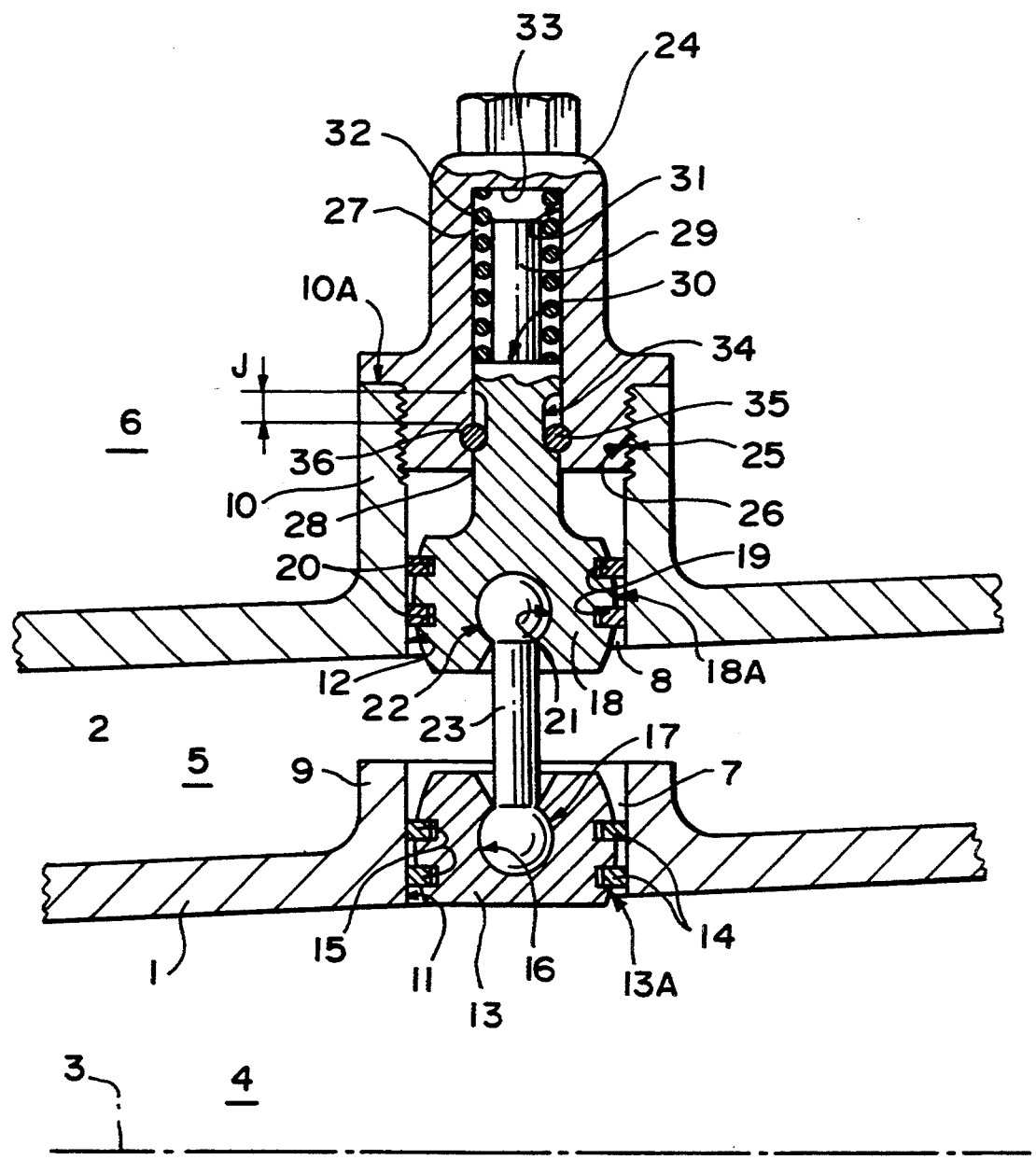
FIG. 1 is a cross-sectional view illustrating a first embodiment of the removable inspection hole plug according to the present invention.

FIG. 1 is an axial, cross-sectional view of an enclosure incorporating the removable inspection hole plug according to the present invention. As can be seen, a first wall 1 and a second, distinct wall 2 form part of a compressor casing for a gas turbine engine (not otherwise shown) which walls define enclosures extending around axis of revolution 3. As is well known in the art, this enclosure houses the compressor vanes and blades (not shown). First wall 1 defines first enclosure 4, while second enclosure 5 is defined by second wall 2 and is located on an opposite side of wall 1 from enclosure 4. Space 6 is located on an opposite side of the second wall 2 relative to enclosure 5.

The enclosures 4 and 5, as well as space 6, hold fluids, in this particular instance oxidizer for the gas turbine engine, that are required for the operation of the gas turbine engine and which may have substantial temperatures. Illustratively, the compressed oxidizer, which is compressed in the first enclosure 4, may have a temperature of approximately 500° C., while the temperature of the fluid in the second enclosure 5 may have a temperature of approximately 50° to 100° C. The temperature of the fluid in the space 6 may have a temperature of approximately 0° to 40° C.

Inspection holes 7 and 8 are defined by wall portions 9 and 10, respectively, and pass through the walls 1 and 2. Inspection holes 7 and 8 have may have a generally cylindrical configuration defined by inner surfaces 11 and 12 of the walls 9 and 10.

A first sealing unit having a solid body portion 13 with a generally convex outer, axial surface 13A and seals 14, is located in the inspection hole 7 such that the seals 14 sealingly engage surface 11. Seals 14 may be located in transverse grooves 15 defined by the sealing unit 13. The sealing unit 13 defines a generally spherical socket 16 configured to receive a ball 17 so as to pivotally attach link rod 23 to the sealing unit 13.

A second sealing unit 18 also has a generally convex axial surface 18A which defines one or more grooves 20 in which are located seals 19 in sealing contact with the cylindrical surface 12 of the inspection hole 8. The sealing unit 18 also defines a generally spherical cavity 21 configured to receive the ball 22 of link rod 23 in order to pivotally attach the link rod 23 to the sealing unit 18. As can be seen, balls 17 and 22 are located on opposite ends of the link rod 23.

A housing 24 having threads 25 thereon is threaded onto threads 26 formed on the cylindrical surface 12 of the second enclosure wall 2. The housing 24 seals against the transverse outer surface 10A of the wall portion 10.

Housing 24 defines a blind hole 27 having an end 33 and, at an opposite end, aperture 28 opening towards the sealing unit 18. The blind hole 27 comprises a receptacle for an end of the pull rod 29 which, as its opposite end, is attached to sealing unit 18. Pull rod 29 has a shoulder 30 formed thereon which extends into the inner cylindrical surface 31 defining the blind hole 27. Spring 32 extends between the shoulder 30 and the end 33 of the blind hole and serves to bias the pull rod 29 in a direction away from the end 33 of the blind hole 27.

Pull rod 29 also defines an elongated groove 34 which has an axial clearance J relative to a retaining ring 35 located in a groove 36 defined by the cylindrical surface 31 of housing 24. As can be seen, the retaining ring 35 attaches the housing 24 to the pull rod 29 such that pull rod 29 may undergo limited axial movement relative to the housing 24. Such axial movement is limited by the clearance J between the retaining ring 35 and the end of the elongated groove 34.

Figure 2:
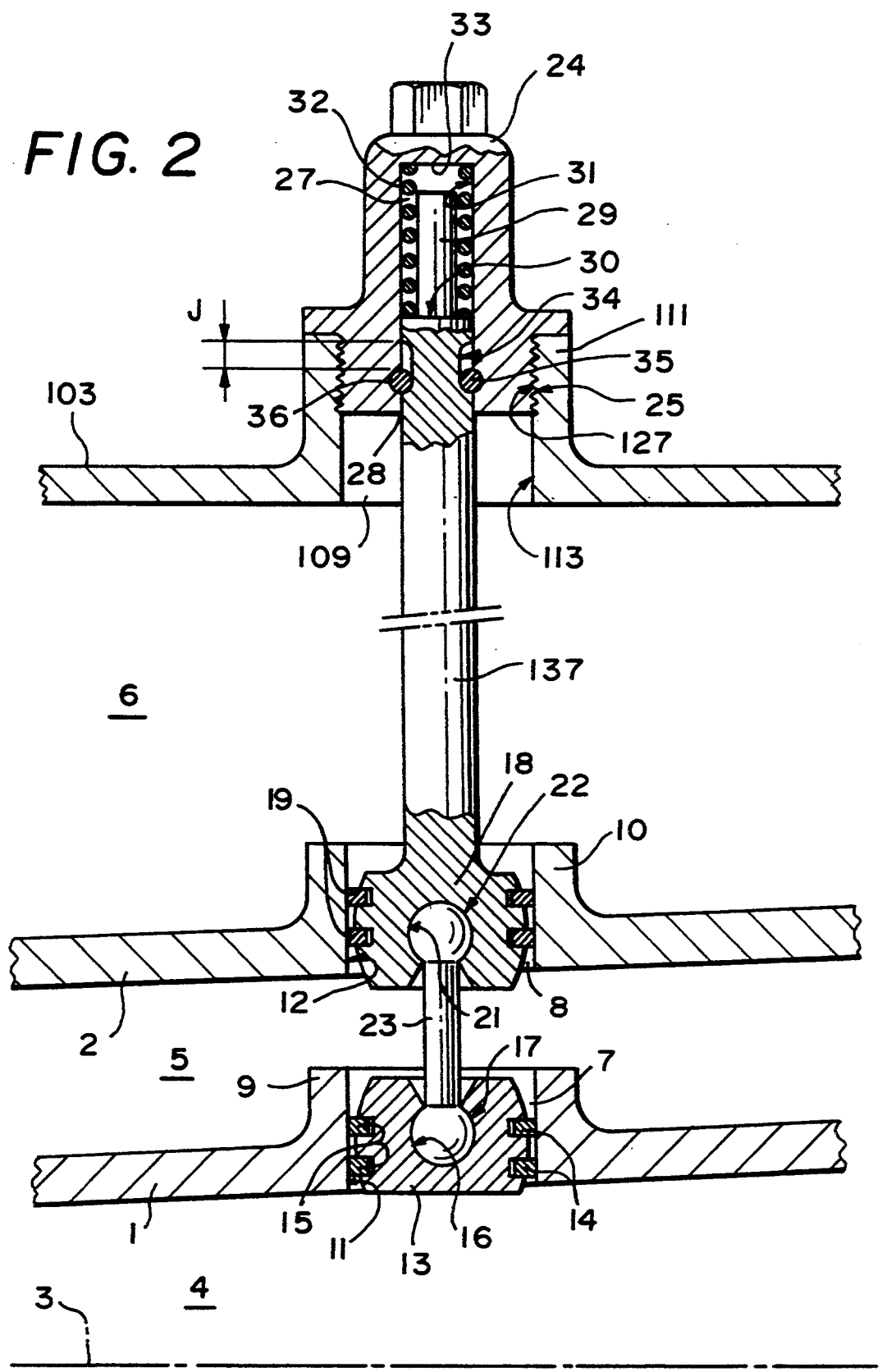
FIG. 2 is a cross-sectional view illustrating a second embodiment of the removable inspection hole plug according to the present invention.

The embodiment illustrated in FIG. 2 is similar to that shown in FIG. 1 except for wall 103 which encloses the space 6. A third inspection hole 109 is defined by collar 111 formed on the wall 103 and defines an inner cylindrical surface 113. In this embodiment, the housing 24 is threaded onto the collar 111 by the interengagement of threads 25 and 127. The housing 24 is oriented such that the aperture 28 of the blind hole 27 faces toward the wall 2.

The blind hole 27 receives an end of the pull rod 29 as in the previously described embodiment so as to undergo limited axial movement relative to the housing 24. Pull rod 29 is affixed to intermediate rod 137 which rigidly attaches the pull rod 29 to the sealing unit 18. The operation of the device is exactly the same as that described in relation to FIG. 1.

In operation, it will be assumed that the gas turbine engine has been stopped for a sufficient amount of time so that all of its components are at approximately the same temperature and that the fluids contained in the enclosures 4, 5 and 6 and the walls 1 and 2 are at a common temperature. In this instance, the inspection holes 7 and 8 will be substantially coaxially aligned. Under such circumstances, sealing units 13 and 18 are inserted into the holes 7 and 8, respectively, and are affixed in place by attaching the housing 24 to either the wall portion 10 or the collar 111. Removal of the inspection hole plug is achieved by merely unscrewing the housing 24 and removing it from the engine along with the sealing units 13 and 18.

After the gas turbine engine is put into operation, the temperatures of the walls 1 and 2 will be significantly different and, consequently, there will be a differential thermal expansion and the inspection holes 7 and 8 may no longer be coaxially aligned. However, the sealing of the inspection holes 7 and 8 will be preserved and the wall will be free to expand. A radial expansion component of the walls 1 and 2 (generally perpendicular to the axis 3) is made possible by the sliding motion of the sealing units 13 and 18 inside the inspection holes 7 and 8 with the seals 14 and 19 remaining in sealing contact with the cylindrical surfaces 11 and 12 of the inspection holes. Such radial expansion is also facilitated by the axial movement of the pull rod 29 relative to the housing 24.

An axial or circumferential component of the differential thermal expansion is accommodated by the ball and socket swivel joints connecting the link rod 23 to the sealing units 13 and 18. Such swivel connections enable relative axial or circumferential displacement of the sealing units while maintaining the sealing contact between the seals 14 and 19 with the surfaces 11 and 12, respectively.

Although a ball and socket-type swivel joint is shown connecting the link rod 23 to the sealing units 13 and 18, quite obviously other pivoting joints may be utilized, such as pivoted hinge arms, without exceeding the scope of this invention.

The foregoing description is provided for illustrative purposes only and should not be construed as in any way limiting this invention, the scope of which is defined solely by the appended claims.

I claim:

1. A removable inspection hole plug for sealing first and second inspection holes formed in first and second enclosures, comprising:
    a) the first sealing unit located in a first inspection hole so as to be in sliding sealing contact with a wall defining the first inspection hole;
    b) the second sealing unit located in a second inspection hole so as to be in sliding sealing contact with a wall defining the second inspection hole; and,
    c) a link rod pivotally attached to, and extending between, the first and second sealing units.

2. The removable inspection hole plug of claim 1 wherein the link rod is pivotally attached to each of the first and second sealing units by a ball and socket swivel joint.

3. The removable inspection hole plug of claim 1 wherein each inspection hole has a generally cylindrical configuration and wherein each sealing unit comprises:
    a) a sealing body having a generally convex outer surface;
    b) at least one channel defined by the sealing body extending around the generally convex outer surface; and,
    c) a seal element located in the at least one channel.

4. The removable inspection hole plug of claim 1 further comprising:
    a) a housing defining a blind hole therein;
    b) a pull rod attached to one of the sealing units and having an end located in the blind hole; and,
    c) attaching means to attach the pull rod to the housing such that the pull rod may undergo limited axial movement relative to the housing.

5. The removable inspection hole plug of claim 4 wherein the attaching means comprises:
    a) a first groove defined by and extending around the pull rod, the first groove elongated in an axial direction;
    b) a second groove defined by the housing;
    c) a retaining ring extending into the first and second grooves.

6. The removable inspection hole plug of claim 4 further comprising means to fasten the housing to one of the first and second enclosures.

7. The removable inspection hole plug of claim 6 wherein the fastening means comprises:
    a) a first threaded portion formed on one of the first and second enclosures; and, b) a second threaded portion formed on the housing so as to engage the first threaded portion.

8. The removable inspection hole plug of claim 4 further comprising:

a) a third enclosure having a wall defining a third inspection hole;

b) fastening means to fasten the housing to the wall defining the third inspection hole.

9. The removable inspection hole plug of claim 8 wherein the fastening means comprises:

a) a first threaded portion formed on the wall defining the third inspection hole; and, b) a second threaded portion formed on the housing so as to engage the first threaded portion.

* * * * *